(12) United States Patent
Miyazaki

(10) Patent No.: US 7,349,560 B2
(45) Date of Patent: Mar. 25, 2008

(54) FINGERPRINT VERIFICATION DEVICE AND METHOD FOR THE SAME

(75) Inventor: Jun Miyazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 694 days.

(21) Appl. No.: 10/788,347

(22) Filed: Mar. 1, 2004

(65) Prior Publication Data

US 2004/0170306 A1 Sep. 2, 2004

(30) Foreign Application Priority Data

Feb. 28, 2003 (JP) ............................. 2003-053513

(51) Int. Cl.
*G06K 9/00* (2006.01)
(52) U.S. Cl. ...................................... 382/124; 382/125
(58) Field of Classification Search ................. 382/124
See application file for complete search history.

(56) References Cited

U.S. PATENT DOCUMENTS 4,581,760 A * 4/1986 Schiller et al. ............. 382/124
5,796,857 A * 8/1998 Hara .......................... 382/124

FOREIGN PATENT DOCUMENTS

| JP | 10-105711 | 4/1998 |
| JP | 2001-67474 | 3/2001 |
| JP | 2002-269562 | 9/2002 |

OTHER PUBLICATIONS

Zhang et al., "Core-based structure matching algorithm of fingerprint verification," Aug. 11-15, 2002, vol. 1, pp. 70-74.*

* cited by examiner

*Primary Examiner*—Jingge Wu
*Assistant Examiner*—John W Lee
(74) *Attorney, Agent, or Firm*—McGinn IP Law Group, PLLC

(57) ABSTRACT

A fingerprint verification process system comprises analysis means for analyzing fingerprint data to determine a verification scheme for verifying fingerprint, and execution means for verifying fingerprint using the determined verification scheme. The analysis means (i) transforms a coordinate position of each searched fingerprint feature point included in the fingerprint data being searched to a coordinate position in a coordinate system based on a coordinate reference point included in the filed fingerprint data, (ii) with respect to a group of searched fingerprint feature points located around the coordinate reference point and a group of filed fingerprint feature points included in the filed fingerprint data, carries out (a) a check of the presence or absence of any singular point sprinkled in a vicinity coordinate range of the coordinate reference point which is specified in a fingerprint verification parameter, (b) a zone check of a coordinate reference point vicinity coordinate range, and (c) a quality check of a group of feature points located within a coordinate reference point vicinity coordinate range, (iii) determines which of an axis verification scheme or an alignment verification scheme is to be used.

9 Claims, 5 Drawing Sheets n3:FINGERPRINT VERIFICATION SYSTEM MANAGEMENT SERVER n6:FINGERPRINT VERIFICATION PROCESS DEVICE n65: FINGERPRINT VERIFICATION DATA STORAGE AREA m4: VERIFICATION PROGRAM STORAGE AREA

FINGERPRINT VERIFICATION DEVICE AND METHOD FOR THE SAME

BACKGROUND OF THE INVENTION

1. Field of the Invention

The present invention relates to a fingerprint verification device and a fingerprint verification method, which are directed to a fingerprint verification scheme performed by verifying fingerprint data being searched with filed fingerprint data.

2. Description of the Related Art

Conventional fingerprint verification has representative verification schemes including an axis verification scheme and an alignment verification scheme.

The axis verification scheme is characterized by a verification process of searched fingerprint feature points and filed fingerprint feature points whose positions are represented in a two-axis coordinate system based on a coordinate reference point (a coordinate position of a singular point such as a core and a delta) which is preset in filed fingerprint data.

The alignment verification scheme is characterized by a verification process of searched fingerprint feature points and filed fingerprint feature points whose positions are represented in a two-axis coordinate system based on a coordinate reference point which is calculated by an adjusting process without using a coordinate reference point preset in filed fingerprint data.

Prior art documents relating to the fingerprint verification includes the following: JP-A-H10(1998)-105711, JP-A-2001-067474, and JP-A-2002-269562.

The axis verification scheme can provide a significantly high verification precision for the verification of taken fingerprints (which most probably have a singular point such as a core and a delta), because the use of the singular point as the coordinate reference point can make it possible to clearly distinguish the feature point arrangements around the coordinate reference point and because high image quality is available. On the other hand, for the left-behind fingerprints verification in which the feature point data are only partially available and the singular point or the like cannot easily be set as the coordinate reference point, a hypothetical coordinate reference point (the center of the fingerprint impression image) is often used. Displacement thus occurs between the coordinate positions of the searched fingerprint feature points relative to the coordinate reference point and the positions on the real image. The image quality is also often inferior. There has therefore been a problem in which an inaccurate or falsely-recognized coordinate arrangement may happen and much lower verification precision may occur.

The alignment verification scheme determines the coordinate reference point from the data arrangement using a coordinate matching amount without using a predetermined coordinate reference point. The verification based on a false coordinate position may thus occur less often, thereby resulting in a high verification precision for the left-behind fingerprints verification. On the other hand, there has been a problem in which the alignment process needs an enormous amount of process, thereby resulting in much lower verification performance than the above-mentioned verification scheme.

Different fingerprint verification system needs to be constructed for each fingerprint verification engine to be used and for each use, so that the system construction is extremely expensive.

SUMMARY OF THE INVENTION

The present invention has been made with due consideration to the foregoing difficulties, and an object of the present invention is to provide a fingerprint verification device with fingerprint data analysis which makes possible a precise high-speed fingerprint verification for both the taken fingerprints and the left-behind fingerprints.

According to the present invention, there is provided a fingerprint verification device for verifying fingerprint data being searched with filed fingerprint data, comprising: analysis means for analyzing above-mentioned fingerprint data being searched to determine a verification scheme for executing above-mentioned verification; and execution means for executing above-mentioned verification using above-mentioned determined verification scheme.

In the above fingerprint verification device, above-mentioned analysis may be an analysis on a coordinate reference point.

In the above fingerprint verification device, the analysis means may be configured to: (i) transform a coordinate position of each searched fingerprint feature point included in the fingerprint data being searched to a coordinate position in a coordinate system based on a coordinate reference point included in the filed fingerprint data; (ii) with respect to a group of searched fingerprint feature points located around the coordinate reference point and a group of filed fingerprint feature points included in the filed fingerprint data, carry out (a) a check of the presence or absence of any singular point sprinkled in a vicinity coordinate range of the coordinate reference point which is specified in a fingerprint verification parameter, (b) a zone check of a coordinate reference point vicinity coordinate range, and (c) a quality check of a group of feature points located within a coordinate reference point vicinity coordinate range; (iii) determine which of an axis verification scheme or an alignment verification scheme is to be used.

In the above fingerprint verification device, the analysis means may configured to: (i) check, for all filed fingerprint feature points included in fingerprint data being searched, whether any feature point lies in a coordinate reference point vicinity coordinate range which provides a coordinate range of a coordinate reference point vicinity coordinate range radius with a coordinate reference point designated as a center; (ii) if any feature point lies in a coordinate reference point vicinity coordinate range, then check whether the feature point type is a singular point and a quality category is significant or normal; (iii) if the check results are positive, calculate (a) a low confidence rate for a group of vicinity feature points located in a coordinate reference point vicinity coordinate range which provides a coordinate range of a coordinate reference point vicinity coordinate range radius with a coordinate reference point designated as a center, (b) an average reliability frequency for a group of vicinity feature points located in a vicinity coordinate range of a radius with a coordinate reference point designated as a center, and (c) a clarity rate of any zone area in a fingerprint impression image for a group of vicinity feature points located in a coordinate reference point vicinity coordinate range of a coordinate reference point vicinity coordinate range radius with a coordinate reference point designated as a center; (iv) check whether (a) the calculated low-confidence rate of a group of vicinity feature points is below a low-confidence rate threshold, and (b) the calculated average reliability frequency is equal to or more than a average reliability frequency threshold, and (c) the calculated zone clarity rate is equal to or more than a zone clarity rate threshold; (v) if the check results meet all positive conditions, select an axis verification scheme; and (vi) if not, select an alignment verification scheme.

DETAILED DESCRIPTION OF THE PREFERRED EMBODIMENTS

The present invention is characterized by a fingerprint verification process system for verifying fingerprint data being searched of feature points extracted by the feature extraction process from a fingerprint impression image and filed fingerprint data which are databased, in which the verification is carried out with a verification engine being dynamically switched and selected for each fingerprint data depending on the data characteristic, in order to compensate for advantages and disadvantages of the different verification schemes which occur for different data characteristic, and to eliminate the need to construct a dedicated verification system for each use, and to obtain highly reliable verification precision.

Figure 1:
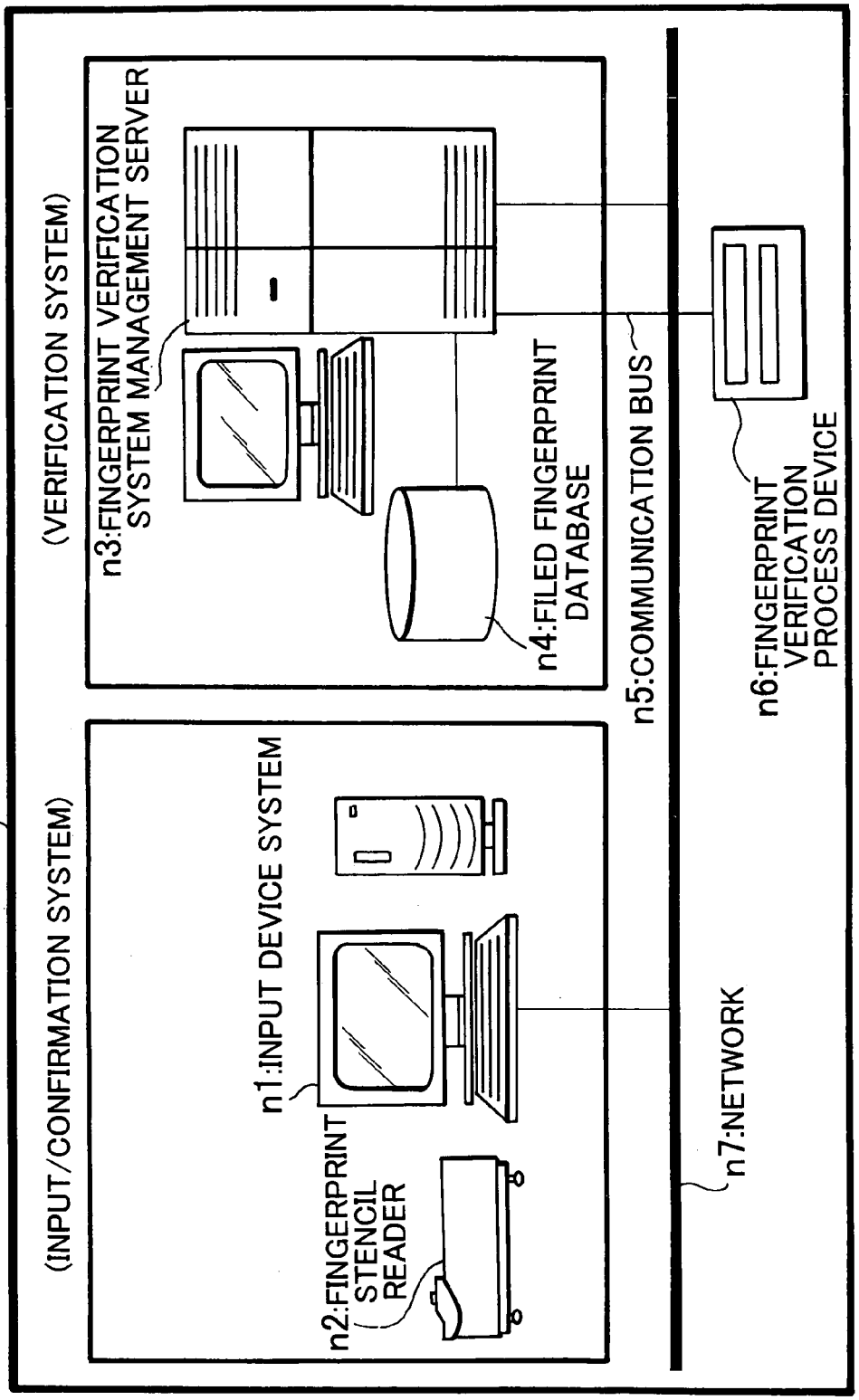
FIG. 1 shows a block diagram of a configuration of a fingerprint verification device according to an embodiment of the present invention.

With reference to FIG. 1, a fingerprint verification processing system a1 serving as a fingerprint verification device according to the present invention will now be described. As shown in FIG. 1, the fingerprint verification processing system a1 comprises a fingerprint verification system management server n3, an input device system n1 which reads a fingerprint impression image via a fingerprint stencil reader n2 and creates searched fingerprint data (that is, fingerprint data being searched) from the image through a feature extraction process and then transmits via a network n7 the searched fingerprint data to the fingerprint verification system management server n3, a filed fingerprint data base n4 which is connected as an external memory device to the fingerprint verification system management server n3 and saves filed fingerprint data which are databased, a fingerprint verification process device n6 which is connected via a communication bus n5 to the fingerprint verification system management server n3 and carries out a verification process in response to a fingerprint-verification-execution instruction from the fingerprint verification system management server n3.

Figure 2:
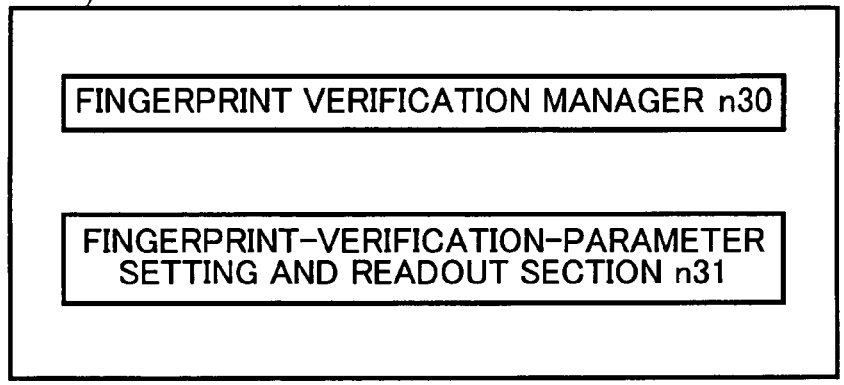
FIG. 2 shows a block diagram of a configuration of the fingerprint verification system management server shown in FIG. 1.

As shown in FIG. 2, the fingerprint verification system management server n3 comprises a fingerprint verification manager n30 and a fingerprint-verification-parameter setting and readout section n31.

The fingerprint verification manager n30 sends following instructions to the fingerprint verification process device n6 via the communication bus n5: a filed fingerprint data transmission instruction added with a filed fingerprint data read out from the filed fingerprint database n4, a searched fingerprint data transmission instruction added with a searched fingerprint data input from the input device system n1, a fingerprint verification execution instruction, and a fingerprint verification parameter transmission instruction added with a fingerprint verification parameter read out from the fingerprint-verification-parameter setting and readout section n31.

The fingerprint-verification-parameter setting and readout section n31 previously sets or changes the fingerprint verification parameter via operator's manual operation. The fingerprint verification parameter set by the fingerprint-verification-parameter setting and readout section n31 specifies the verification parameter and threshold which are necessary for the fingerprint verification in the fingerprint verification process device n6.

In the present embodiment according to the present invention, a coordinate reference point vicinity coordinate range radius, a low-confidence-rate threshold, an average reliability frequency threshold, and a zone clarity rate threshold need to be preset for use in a new quality check around the coordinate reference point.

The feature extraction process by the input device system n1 previously transforms the fingerprint impression image input from the fingerprint stencil reader n2 to the searched fingerprint data and filed fingerprint data. It is assumed that the feature-extracted filed-fingerprint data is databased and previously saves in the filed fingerprint database n4.

The searched fingerprint data and filed fingerprint data include following feature points information which are extracted from the fingerprint impression image by the feature extraction process: (i) axis information (which indicates a coordinate reference point (midpoint) in an XY two-axis coordinate system of a coordinate system in which the feature points exist); (ii) position information (which indicates an X coordinate value and Y coordinate value in an XY two-axis coordinate system based on the coordinate reference point); (iii) ridge direction (which indicates a ridge flow direction relative to the Y axis in an XY two-axis coordinate system based on the coordinate reference point); (iv) compactness (which indicates the number of feature points located within a radius r1 from a feature point designated as the center); (v) left curvature/right curvature (which indicates a curve degree of ridges on left/right sides of a feature point); (vi) feature point type (which indicates the type of a feature point and falls into endpoint, branch point, and singular point); (vii) quality category (which indicates the significance of a feature point and falls into non-significant, normal and significant); and (viii) confidence-reliability (which indicates the confidence classification (existence low confidence, direction low confidence) of a feature point and the reliability frequency of any feature point). Each fingerprint data also includes zone information which indicates the clarity of a fingerprint impression image at the coordinate position of a feature point.

Figure 3:
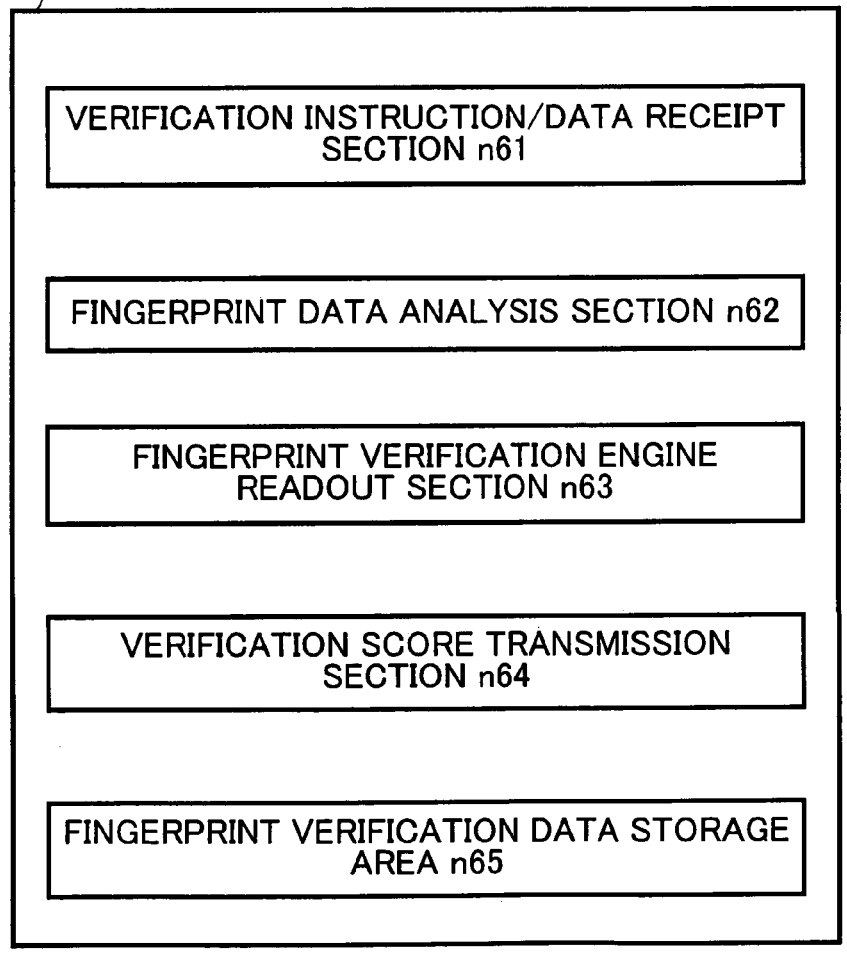
FIG. 3 shows a block diagram of a configuration of the fingerprint verification process device shown in FIG. 1.

As shown in FIG. 3, the fingerprint verification process device n6 comprises a verification instruction/data receipt section n61, a fingerprint data analysis section n62, a fingerprint verification engine readout section n63, a verification score transmission section n64, and a fingerprint verification data storage area n65.

The verification instruction/data receipt section n61 receives a searched fingerprint data transmission instruction, a filed fingerprint data transmission instruction, a fingerprint verification parameter transmission instruction, and a fingerprint verification execution instruction all of which are transmitted from the fingerprint verification manager n30 in the fingerprint verification system management server n3.

After receiving the searched fingerprint data transmission instruction from the fingerprint verification manager n30 in the fingerprint verification system management server n3, the verification instruction/data receipt section n61 saves the searched fingerprint data added to the searched fingerprint data transmission instruction into the searched fingerprint data storage area m1 in the fingerprint verification data storage area n65 which is a memory space in the fingerprint verification process device n6.

Like this, after receiving the filed fingerprint data transmission instruction, the verification instruction/data receipt section n61 also saves the filed fingerprint data added to the filed fingerprint data transmission instruction into the filed fingerprint data storage area m2.

After receiving the fingerprint verification parameter transmission instruction from the fingerprint verification manager n30 in the fingerprint verification system management server n3, the verification instruction/data receipt section n61 saves the fingerprint verification parameter added to the fingerprint verification parameter transmission instruction into the fingerprint verification parameter storage area m3 which is a memory space in the fingerprint verification process device n6.

After receiving the fingerprint verification execution instruction from the fingerprint verification manager n30 in the fingerprint verification system management server n3, the verification instruction/data receipt section n61 passes the control to the fingerprint data analysis section n62. The section n61 also passes the address information about the searched fingerprint data storage area m1, the filed fingerprint data storage area m2, and the fingerprint verification parameter storage area m3 together at the same time.

The fingerprint data analysis section n62 (i) transforms the coordinate position of each searched fingerprint feature point included in the searched fingerprint data which is stored in the searched fingerprint data storage area m1 to the coordinate position in the coordinate system based on the coordinate reference point included in the filed fingerprint data which is stored in the filed fingerprint data storage area m2, (ii) with respect to a group of searched fingerprint feature points located around the coordinate reference point and a group of filed fingerprint feature points included in the filed fingerprint data, carries out a check of the presence or absence of any singular point sprinkled in the vicinity coordinate range of the coordinate reference point which is specified in the fingerprint verification parameter, a zone check of the coordinate reference point vicinity coordinate range, and a quality check of a group of feature points located within the coordinate reference point vicinity coordinate range (low confidence rate evaluation, average reliability number evaluation, and zone clarity rate evaluation of a group of vicinity feature points), (iii) determines a fingerprint verification engine program which is determined to be most suitable for verification of the fingerprint data to be verified (an axis verification scheme fingerprint verification engine program m41 or an alignment verification scheme fingerprint verification engine program m42), and (iv) passes to the fingerprint verification engine readout section n63 the verification engine type to be used.

The fingerprint verification engine readout section n63 (i) loads the selected fingerprint verification engine program (the axis verification scheme fingerprint verification engine program m41 or the alignment verification scheme fingerprint verification engine program m42) from the program storage area m4 in the program which can save as data the fingerprint verification engine selected for the fingerprint verification execution, (ii) passes to the loaded program the addresses in the memory space of the searched fingerprint data and filed fingerprint data which are saved in the memory space, (iii) passes the program control to any verification engine program, (iv) carries out the verification process in each fingerprint verification engine program, and (v) passes to the verification score transmission section n64 a verification score which is finally calculated as a scale to measure the similarity between the searched fingerprint data and the filed fingerprint data.

The verification score transmission section n64 transmits to the fingerprint verification system management server n3 the verification score received from the fingerprint verification engine program (the axis verification scheme fingerprint verification engine program m41 or the alignment verification scheme fingerprint verification engine program m42).

Figure 4:
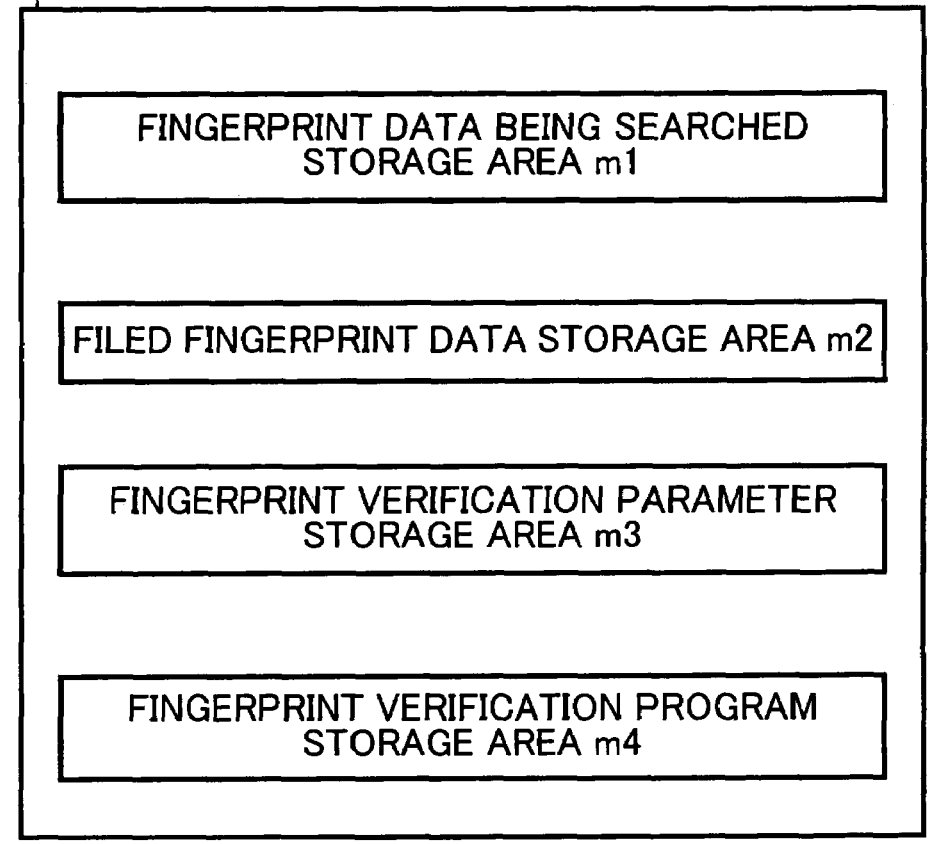
FIG. 4 shows a block diagram of a configuration of the fingerprint verification data storage area shown in FIG. 3.

As shown in FIG. 4, the fingerprint verification data storage area n65 comprises a searched fingerprint data storage area m1, a filed fingerprint data storage area m2, a fingerprint verification parameter storage area m3, and a fingerprint verification program storage area m4.

The searched fingerprint data-storage area m1 stores the searched fingerprint data received from the fingerprint verification system management server n3.

The filed fingerprint data storage area m2 stores the filed fingerprint data received from the fingerprint verification system management server n3.

The fingerprint verification parameter storage area m3 stores the fingerprint verification parameter received from the fingerprint verification system management server n3.

The fingerprint verification program storage area m4 is a memory area which can save data and is assumed to previously save the axis verification scheme fingerprint verification engine program m41 and alignment verification scheme fingerprint verification engine program which are the fingerprint verification engine programs with different verification schemes.

Figure 5:
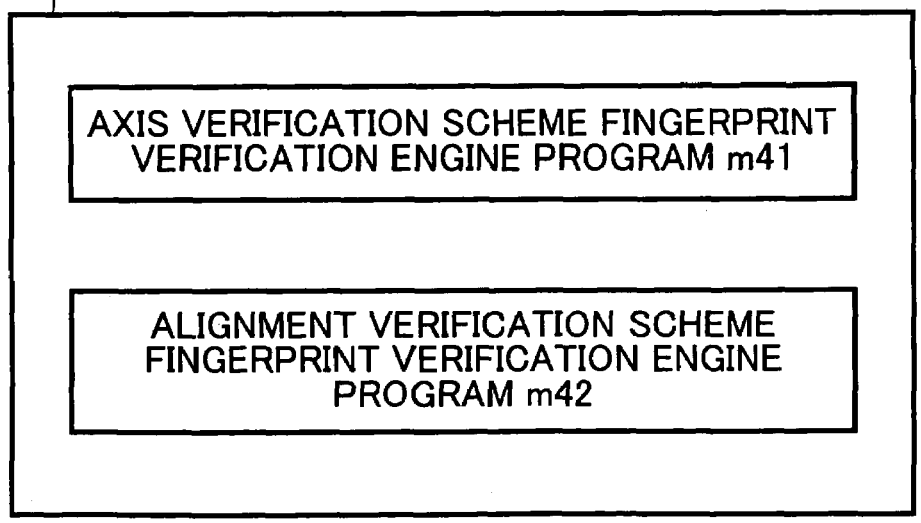
FIG. 5 shows an area allocation of the fingerprint verification program storage area shown in FIG. 4.

As illustrated in FIG. 5, the fingerprint verification program storage area m4 saves the axis verification scheme fingerprint verification engine program engine m41 and alignment verification scheme fingerprint verification engine program m42.

The axis verification scheme fingerprint verification engine program m41 is a scheme which (i) determines the coordinate reference point (verification reference point) from the axis information included in the filed fingerprint data, (ii) represents the positions of feature points included in the searched fingerprint data and filed fingerprint data in the XY two-axis coordinate system based on the coordinate reference point (verification reference point), (iii) superposes the searched fingerprint feature points and filed fingerprint feature points by rotation and translation of the feature points coordinates, (iv) obtains a distance error between the coordinates of any searched fingerprint feature point and any filed fingerprint feature point, (v) selects and evaluates as pair candidates the feature points within a specified range indicated in the fingerprint verification parameter, and determines the final pair candidates, (vi) statistically calculates similarity between pair candidates, and (vii) evaluates the calculated value to obtain a verification score. The coordinate reference points, a plurality of which can be specified, are assumed to be provided for four axes here.

The alignment verification scheme fingerprint verification engine program m42 is a scheme which (i) calculates the coordinate reference point by an adjusting process without using a predetermined axis coordinate (coordinate reference point), (ii) matches the coordinate positions of the searched fingerprint feature points and filed fingerprint feature points, (iii) superposes the searched fingerprint feature points and filed fingerprint feature points by rotation and translation of the feature points coordinates in the XY two-axis coordinate system based on the coordinate reference point, (iv) obtains a distance error between the coordinates of any searched fingerprint feature point and any filed fingerprint feature point, (v) selects and evaluates as pair candidates the feature points within a specified range indicated by the fingerprint verification parameter, and determines the final pair candidates, (vi) statistically calculates similarity between pair candidates, and (vii) evaluates the calculated value to obtain a verification score.

The alignment process first determines, from the coordinate amount (position, direction, and left/right curvatures) of any searched fingerprint feature point, a group of feature points within the specified range as a minutiae set, and determines a search side minutiae set and a file side minutiae set and selects the sets as a corresponding minutiae pair in which the feature points are arranged within the specified value specified in the fingerprint verification parameter. The alignment process then evaluates a plurality of the selected minutiae candidate pairs using a threshold specified in the fingerprint verification parameter and selects fewer minutiae candidate pairs. The process thus obtains, from the selected fewer minutiae candidate pairs, a coordinate transformation amount which indicates the amount of coordinate translation and rotation of the searched fingerprint feature points to the corresponding filed fingerprint feature points to allow the points to have the same coordinate positions. The process then obtains the coordinate reference point from this coordinate transformation amount.

The alignment process determines the search side minutiae set and filed minutiae set for all the filed fingerprint feature points for each searched fingerprint feature point. The number of combinations of the search side minutiae set and filed minutiae set is thus up to the number of searched fingerprint feature points by the number of filed fingerprint feature points.

Figure 6:
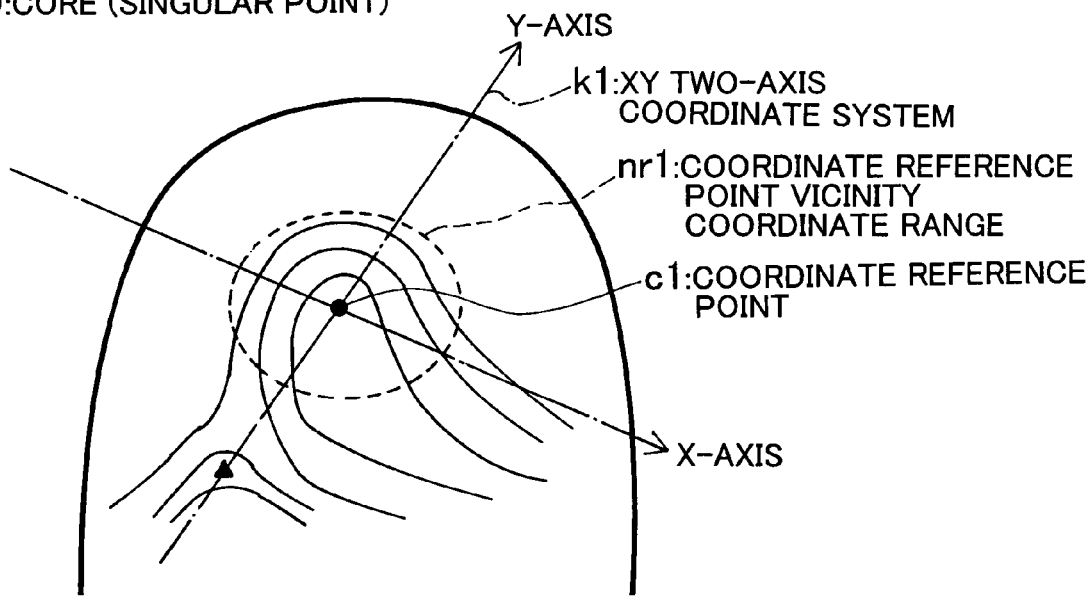
FIG. 6 illustrates the axis verification scheme.

As explained in FIG. 6, the axis verification scheme fingerprint verification engine program m41 uses the coordinate reference point c1 which is the reference point in the XY two-axis coordinate system k1 based on the singular point (core, delta). This XY two-axis coordinate system k1 represents the coordinate points of the searched fingerprint feature points and filed fingerprint feature points for the verification process.

Figure 7:
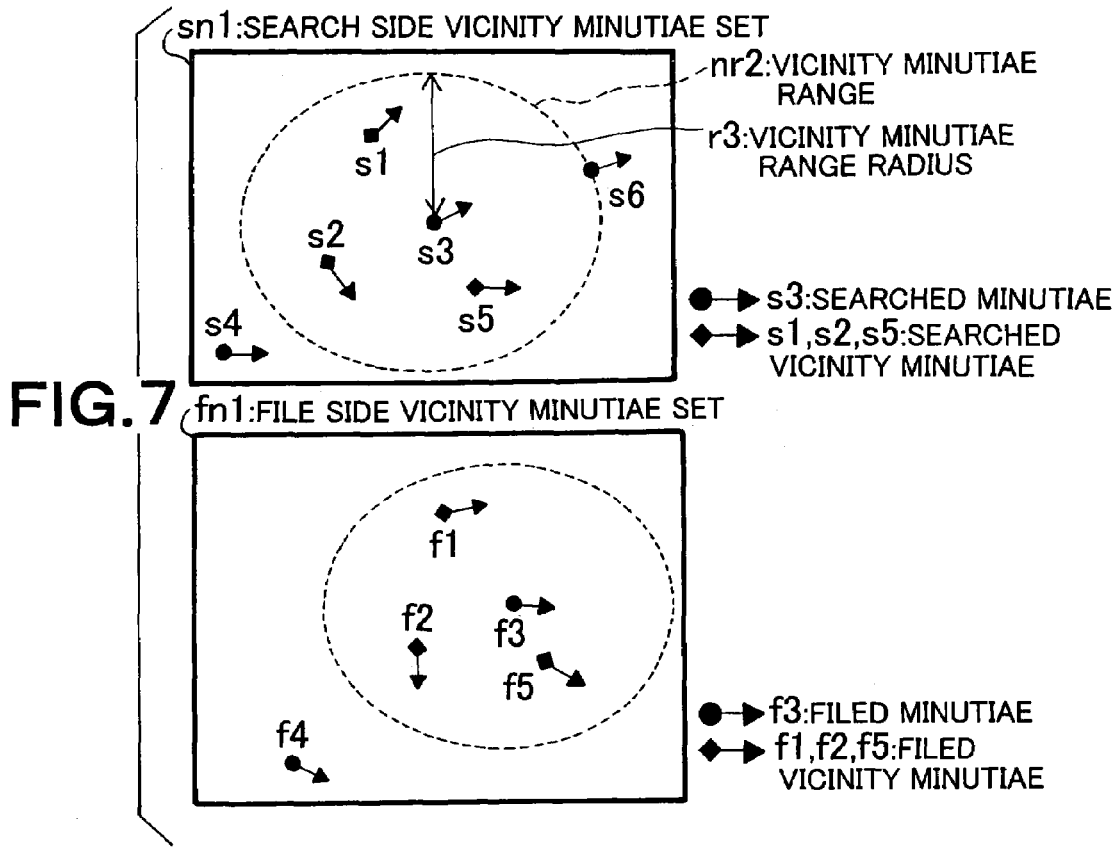
FIG. 7 illustrates the alignment verification scheme.

As explained in FIG. 7, the alignment verification scheme fingerprint verification engine program m42 carries out an alignment process which determines, from the coordinate amount (position, direction, and left/right curvatures) of any searched fingerprint feature point s3, a group of searched fingerprint feature points (s1, s2, s5) within the vicinity minutiae range nr2 with the vicinity minutiae range radius r3 as a search side vicinity minutiae set sn1.

The alignment process also determines, from the coordinate amount (position, direction, and left/right curvatures) of any filed fingerprint feature point f3, a group of searched fingerprint feature points (f1, f2, f5) within the vicinity minutiae range nr2 with the vicinity minutiae range radius r3 as a file side vicinity minutiae set fn1.

The search side minutiae set sn1 and file side minutiae set fn1 are determined and then superposed in a coordinate system by rotation and translation movements of the coordinates. Combinations of the two sets which reduce the calculated value of the movement distance are determined as the minutiae candidate pair. The coordinate reference point is calculated from the coordinate transformation amount (which indicates the rotation and translation amounts to transfer the search side minutiae set sn1 to the file side minutiae set fn1) to provide the minutiae candidate pair.

The coordinate reference point is obtained for each minutiae candidate pair. The searched fingerprint data and filed fingerprint data are verified for each coordinate reference point. Finally, the similarity obtained based on each coordinate reference point is statistically calculated as a verification score which is transmitted to the fingerprint verification system management server n3.

Figure 8:
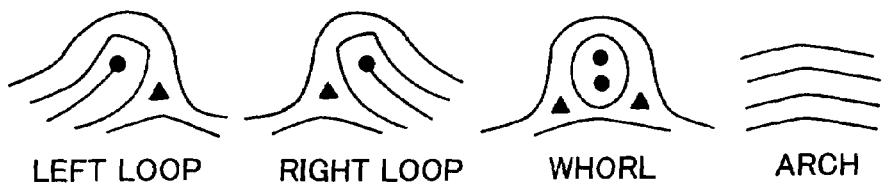
FIG. 8 illustrates each type of the fingerprint.

As illustrated in FIG. 8, the pattern of fingerprints can fall into four types: left loop, right loop, whorl, and arch. Patterns except the arch have singular points of core (whorl center) and delta. Feature extraction process often specifies the singular point, if it exists in the input fingerprint image, as the coordinate reference point. If no singular point exists in the input fingerprint image, the coordinate reference point is often hypothetically allocated to a coordinate around the image center.

With reference to FIGS. 1 to 8, the operation of the present embodiment will be described in more detail.

First, the fingerprint verification manager n30 in the fingerprint verification system management server n3 reads the fingerprint verification parameter which is previously set or changed by the fingerprint-verification-parameter setting and readout section n31. The verification manger n30 then adds the verification parameter to the fingerprint verification parameter transmission instruction and transmits the transmission instruction to the fingerprint verification process device n6 via the communication bus n5.

After receiving the fingerprint verification parameter transmission instruction, the fingerprint verification process device n6 saves the received fingerprint verification parameter into the fingerprint verification parameter storage area m3 in the fingerprint verification data storage area n65.

In response to the verification instruction from the operator, the fingerprint verification manager n30 in the fingerprint verification system management server n3 carries out a feature extraction process to extract the feature points from the fingerprint impression image which is readout by the fingerprint stencil reader n2 via the input device system n1. The fingerprint verification manager n30 thus creates searched fingerprint data including axis information, position information, ridge direction, compactness, left/right curvatures, feature point type, quality category, confidence level, reliability, and zone information.

The fingerprint verification manager n30 then transmits the searched fingerprint data transmission instruction (which is added with the searched fingerprint data) to the fingerprint verification process device n6 via the communication bus n5.

The fingerprint verification process device n6 receives the searched fingerprint data transmission instruction (which is added with the searched fingerprint data) by the verification instruction/data receipt section n61. The device n6 then saves the received searched fingerprint data into the searched fingerprint data storage area m1 in the fingerprint verification data storage area n65.

The fingerprint verification manager n30 then transmits the filed fingerprint data transmission instruction (which is added with the filed fingerprint data) and the fingerprint verification execution instruction to the fingerprint verification process device n6 via the communication bus n5.

The fingerprint verification process device n6 receives the filed fingerprint data transmission instruction (which is added with the searched fingerprint data) by the verification instruction/data receipt section n61. The device n6 then saves the filed fingerprint data into the filed fingerprint data storage area m2 in the fingerprint verification data storage area n65.

After receiving the fingerprint verification execution instruction, the verification instruction/data receipt section n61 then passes the control to the fingerprint data analysis section n62 together with the address information of the searched fingerprint data storage area m1, the filed fingerprint data storage area m2, and the fingerprint verification parameter storage area m3.

After receiving the control from the verification instruction/data receipt section n61, the fingerprint data analysis section n62 bases on the coordinate reference point C2 included in the filed fingerprint data which is saved in the filed fingerprint data storage area m2 (the coordinate reference point) to transform the coordinate position of each searched fingerprint feature point included in the searched fingerprint data saved in the searched fingerprint data storage area m1 to the coordinate position in the XY two-axis coordinate system k1 based on the coordinate reference point.

The fingerprint data analysis section n62 first checks, for all the filed fingerprint feature points included in the searched fingerprint data, whether any feature point lies in the coordinate reference point vicinity coordinate range nr1 which provides the coordinate range of the coordinate reference point vicinity coordinate range radius r2 (specified in the fingerprint verification parameter) with the coordinate reference point c1 designated as the center. If any feature point lies in the coordinate reference point vicinity coordinate range nr1, the section n62 then checks whether or not the feature point type is a singular point and the quality category is significant or normal.

If the above-described check results are affirmative, the fingerprint data analysis section n62 then calculates (a) a low confidence rate (=the number of feature points of existence-low confidence divided by the number of vicinity feature points) for a group of vicinity feature points located in the coordinate reference point vicinity coordinate range nr1 which provides the coordinate range of the coordinate reference point vicinity coordinate range radius r2 (specified in the fingerprint verification parameter) with the coordinate reference point c1 designated as the center, (b) an average reliability frequency (=the reliability frequency divided by the number of vicinity feature points) for a group of the vicinity feature points located in the vicinity coordinate range nr1 of the radius r2 (specified in the fingerprint verification parameter) with the coordinate reference point c1 designated as the center, and (c) a clarity rate of any zone area (=the number of feature points having clear zones divided by the number of vicinity feature points) in a fingerprint impression image for a group of vicinity feature points located in the coordinate reference point vicinity coordinate range nr1 of the coordinate reference point vicinity coordinate range radius r2 (specified in the fingerprint verification parameter) with the coordinate reference point c1 designated as the center.

The fingerprint data analysis section n62 then checks whether or not (a) the calculated low-confidence rate of a group of vicinity feature points is below the low-confidence rate threshold (specified in the fingerprint verification parameter), and (b) the calculated average reliability frequency is equal to or more than the average reliability frequency threshold (specified in the fingerprint verification parameter), and (c) the calculated zone clarity rate is equal to or more than the zone clarity rate threshold.

If the above check results meet all the positive conditions, the fingerprint data has high quality, the feature points have high confirmability, and a core fingerprint feature point exists which provides a most suitable coordinate reference point (verification reference point) to reduce displacement on the real image of the coordinate positions of the searched fingerprint feature points. The fingerprint data analysis section n62 then selects the axis verification scheme fingerprint verification engine program m41 which is most suitable for the taken-fingerprints verification.

In contrast, if no feature point (significant feature point which provides a core or a delta feature point) exists within the coordinate reference point vicinity coordinate range nr1, or the calculated low-confidence rate of a group of feature points located within the coordinate reference point vicinity coordinate range nr1 is above the low-confidence rate threshold (specified in the fingerprint verification parameter), or the calculated average reliability frequency is below the average reliability frequency threshold (specified in the fingerprint verification parameter), or the calculated zone clarity rate is below the zone clarity rate threshold, it is then determined that no feature point exists which provides a most suitable coordinate reference point, the fingerprint data has low quality, the feature points have low confirmability, and therefore the fingerprint data is most probably the left-behind-type fingerprint data. The fingerprint data analysis section n62 then selects the alignment verification scheme fingerprint verification engine program m42 which is most suitable for the left-behind-type fingerprints verification.

As described above, depending on the characteristic of the fingerprint data to be verified, the characteristic is analyzed, a verification engine program is determined which is determined to be most suitable for the verification process, and the fingerprint verification engine type to be used is passed to the fingerprint verification engine readout section n63. If a plurality of axes is specified as the axis information, the verification engine is selected for each piece of axis information (coordinate reference point) and subsequent processes are repeated.

The fingerprint verification engine readout section n63 determines the program to be loaded depending on the type of the selected fingerprint verification engine. The engine readout section n63 then loads the axis verification scheme fingerprint verification engine program m41 or alignment verification scheme fingerprint verification engine m42 which are stored in the fingerprint verification program storage area m4 in the fingerprint verification data storage area n65. The section n63 then passes the control to the selected fingerprint verification engine program together with the address information of the searched fingerprint data storage area m1 and filed fingerprint data storage area m2, in which the searched fingerprint data and the filed fingerprint data for use in the verification process are stored, respectively, and with the address information of the fingerprint verification parameter storage area m3.

After receiving the control from the fingerprint verification engine readout section n63, the fingerprint verification engine program (the axis verification scheme fingerprint verification engine program m41 or the alignment verification scheme fingerprint verification engine program m42) selects and determines pair candidates (which are highly similar and selected as a pair of searched fingerprint data and filed fingerprint data) between the given searched fingerprint data and filed fingerprint data, and finally calculates the similarity between the pair candidates as a verification score which are statistically obtained.

The axis verification scheme fingerprint verification engine program m41 determines the coordinate reference point c1 from the axis information included in the filed fingerprint data which is stored in the filed fingerprint data storage area m2. The engine program m41 then transforms the coordinate positions of the searched fingerprint feature points in the searched fingerprint data to the coordinate positions in the XY two-axis coordinate system k1 based on the coordinate reference point c1. The filed fingerprint feature points are represented in the XY two-axis coordinate system k1 based on the coordinate reference point c1 through no coordinate transformation.

The alignment verification scheme fingerprint verification engine program m42 first determines a group of feature points within the vicinity minutiae range nr2 as a minutiae set from the coordinate position (X coordinate value, Y coordinate value) which provides the coordinate amount data for each feature point, the direction (the angle of ridge flow direction relative to the Y axis), the compactness (the number of feature points located within a radius r from a feature point designated as the center) and the curvature (a ratio indicating a degree of the ridge curve) The engine program m42 then determines a search side vicinity minutiae set sn1 and a file side vicinity minutiae set fn1 for each of the searched fingerprint feature point and the filed fingerprint feature point, respectively. The program m42 then selects, as the corresponding minutiae candidate pairs, the combinations of the searched and filed fingerprint feature points in which the feature points are arranged within a specified value specified in the verification parameter, and then evaluates the created corresponding minutiae candidate pairs to select fewer pairs. The program m42 then obtains a coordinate transformation amount indicating the amount of translation and rotation of the searched fingerprint feature point positions to the filed fingerprint feature point positions in the corresponding minutiae pairs to allow the points to have the same coordinate positions. The m42 finally obtains, from this coordinate transformation amount, the coordinate reference point c2 which provides coordinate axes to represent the searched fingerprint feature points and filed fingerprint feature points in the same coordinate system. The engine program m42 then transforms the coordinate positions of the searched fingerprint feature points to the coordinate positions in the XY two-axis coordinate system based on the coordinate reference point c2. The filed fingerprint feature points are represented in the XY two-axis coordinate system based on the coordinate reference point c2 through no coordinate transformation.

Each fingerprint verification engine program (i) superposes the searched fingerprint feature points and filed fingerprint feature points by rotation and translation of the feature points coordinates based on the coordinate reference point c1 or c2, (ii) obtains the distance error between the coordinates, (iii) selects and evaluates as pair candidates the feature points within a specified range indicated in the verification parameter, and determines the final pair candidates, (iv) statistically calculates as a verification score (evaluated value) the similarity showing the degree of how similar each pair group is to each other, and (v) passes the verification score to the verification score transmission section n64.

After receiving the verification score, the verification score transmission section n64 transmits the verification score to the fingerprint verification manager n30.

Note that each section of the fingerprint verification process device n6 (verification instruction/data receipt section n61, fingerprint data analysis section n62, fingerprint verification engine readout section n63, verification score transmission section n64, and fingerprint verification data storage area n65) can also be implemented by the fingerprint verification process device n6 reading and carrying out a program for allowing the sections to function as each section of the fingerprint verification process device n6.

Described above, the primary advantages of the present embodiment can be summarized as follows. Highly reliable verification precision can be provided by allowing for previously saving fingerprint verification engines with different verification schemes on a memory, analyzing data characteristic of the fingerprint data to be verified, selecting for each data a verification engine most suitable for the data characteristic, dynamically switching the verification engines to carry out the verification, and compensating for advantages and disadvantages of the axis verification and alignment verification schemes which occur for different data types.

In the fingerprint verification process device, the verification engine can be dynamically switched to eliminate the need to construct in the fingerprint verification system management server a dedicated fingerprint verification system for each use (personal identification by fingerprinting identification and so on for non-police-type use, identity reference, things-left-behind reference, further crimes reference by left-behind or taken fingerprints verification and so on for police-type use), thereby allowing for significant cost reduction for system construction.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein.

What is claimed is:

1. A fingerprint verification device for verifying fingerprint data with filed fingerprint data, comprising:

analysis means for analyzing said fingerprint data to determine a verification scheme for verifying said fingerprint data; and execution means for verifying said fingerprint data using said determined verification scheme, wherein said analysis means is configured to:

check, for all filed fingerprint feature points included in fingerprint data being searched, whether any feature point lies in a coordinate reference point vicinity coordinate range which provides a coordinate range of a coordinate reference point vicinity coordinate range radius with a coordinate reference point designated as a center;

if any feature point lies in a coordinate reference point vicinity coordinate range, then check whether the feature point type is a singular point and a quality category is significant or normal;

if said check results are positive, calculate:

a low confidence rate for a group of vicinity feature points located in a coordinate reference point vicinity coordinate range which provides a coordinate range of a coordinate reference point vicinity coordinate range radius with a coordinate reference point designated as a center;

an average reliability frequency for a group of vicinity feature points located in a vicinity coordinate range of a radius with a coordinate reference point designated as a center; and a clarity rate of any zone area in a fingerprint impression image for a group of vicinity feature points located in a coordinate reference point vicinity coordinate range of a coordinate reference point vicinity coordinate range radius with a coordinate reference point designated as a center;

check whether:

the calculated low-confidence rate of a group of vicinity feature points is below a low-confidence rate threshold;

the calculated average reliability frequency is equal to or more than a average reliability frequency threshold; and the calculated zone clarity rate is equal to or more than a zone clarity rate threshold;

if the check results meet all the positive conditions, selects an axis verification scheme; and if not, selects an alignment verification scheme.

2. The fingerprint verification device according to claim 1, wherein said analysis is an analysis on a coordinate reference point.

3. The fingerprint verification device according to claim 1, wherein said analysis means is configured to:

(i) transform a coordinate position of each searched fingerprint feature point included in said fingerprint data being searched to a coordinate position in a coordinate system based on a coordinate reference point included in said filed fingerprint data;

(ii) with respect to a group of searched fingerprint feature points located around said coordinate reference point and a group of filed fingerprint feature points included in said filed fingerprint data, carry out (a) a check of the presence or absence of any singular point sprinkled in a vicinity coordinate range of said coordinate reference point which is specified in a fingerprint verification parameter, (b) a zone check of a coordinate reference point vicinity coordinate range, and (c) a quality check of a group of feature points located within a coordinate reference point vicinity coordinate range; and (iii) determine which of an axis verification scheme or an alignment verification scheme is to be used.

4. A method for verifying fingerprint data with filed fingerprint data, comprising:

an analysis step for analyzing said fingerprint data to determine a verification scheme for verifying said fingerprint data, and an execution step for verifying said fingerprint data using said determined verification scheme, wherein in said analysis step:

it is checked, for all filed fingerprint feature points included in fingerprint data being searched, whether any feature point lies in a coordinate reference point vicinity coordinate range which provides a coordinate range of a coordinate reference point vicinity coordinate range radius with a coordinate reference point designated as a center;

if any feature point lies in a coordinate reference point vicinity coordinate range, then it is checked whether the feature point type is a singular point and a quality category is significant or normal;

if said check results are positive, the following are calculated:

a low confidence rate for a group of vicinity feature points located in a coordinate reference point vicinity coordinate range which provides a coordinate range of a coordinate reference point vicinity coordinate range radius with a coordinate reference point designated as a center;

an average reliability frequency for a group of vicinity feature points located in a vicinity coordinate range of a radius with a coordinate reference point designated as a center; and a clarity rate of any zone area in a fingerprint impression image for a group of vicinity feature points located in a coordinate reference point vicinity coordinate range of a coordinate reference point vicinity coordinate range radius with a coordinate reference point designated as a center;

it is checked whether:

the calculated low-confidence rate of a group of vicinity feature points is below a low-confidence rate threshold;

the calculated average reliability frequency is equal to or more than a average reliability frequency threshold; and the calculated zone clarity rate is equal to or more than a zone clarity rate threshold;

if the check results meet all the positive conditions, an axis verification scheme is selected, and if not, an alignment verification scheme is selected.

5. The fingerprint verification method according to claim 4, wherein said analysis is an analysis on a coordinate reference point.

6. The fingerprint verification method according to claim 4, wherein in said analysis step, (i) a coordinate position of each searched fingerprint feature point included in said fingerprint data being searched is transformed to a coordinate position in a coordinate system based on a coordinate reference point included in said filed fingerprint data, (ii) with respect to a group of searched fingerprint feature points located around said coordinate reference point and a group of filed fingerprint feature points included in said filed fingerprint data, (a) a check of the presence or absence of any singular point sprinkled in a vicinity coordinate range of said coordinate reference point which is specified in a fingerprint verification parameter, (b) a zone check of a coordinate reference point vicinity coordinate range, and (c) a quality check of a group of feature points located within a coordinate reference point vicinity coordinate range are carried out, (iii) which of an axis verification scheme or an alignment verification scheme is to be used is determined.

7. A programmable storage medium tangibly embodying a program of machine-readable instructions executable by a digital processing apparatus to perform a method of verifying fingerprint data with filed fingerprint data, the method comprising:

an analysis step for analyzing said fingerprint data to determine a verification scheme for verifying said fingerprint data; and an execution step for verifying said fingerprint data using said determined verification scheme, wherein in said analysis step:
it is checked, for all filed fingerprint feature points included in fingerprint data being searched, whether any feature point lies in a coordinate reference point vicinity coordinate range which provides a coordinate range of a coordinate reference point vicinity coordinate range radius with a coordinate reference point designated as a center;
if any feature point lies in a coordinate reference point vicinity coordinate range, then it is checked whether the feature point type is a singular point and a quality category is significant or normal;
if said check results are positive, the following are calculated:
a low confidence rate for a group of vicinity feature points located in a coordinate reference point vicinity coordinate range which provides a coordinate range of a coordinate reference point vicinity coordinate range radius with a coordinate reference point designated as a center;
an average reliability frequency for a group of vicinity feature points located in a vicinity coordinate range of a radius with a coordinate reference point designated as a center; and
a clarity rate of any zone area in a fingerprint impression image for a group of vicinity feature points located in a coordinate reference point vicinity coordinate range of a coordinate reference point vicinity coordinate range radius with a coordinate reference point designated as a center;
it is checked whether:
the calculated low-confidence rate of a group of vicinity feature points is below a low-confidence rate threshold;
the calculated average reliability frequency is equal to or more than a average reliability frequency threshold; and
the calculated zone clarity rate is equal to or more than a zone clarity rate threshold;
if the check results meet all positive conditions, an axis verification scheme is selected; and
if not, an alignment verification scheme is selected.

8. The storage medium according to claim 7, wherein said analysis is an analysis on a coordinate reference point.

9. The storage medium according to claim 7, wherein in said analysis step,
(i) a coordinate position of each searched fingerprint feature point included in said fingerprint data being searched is transformed to a coordinate position in a coordinate system based on a coordinate reference point included in said filed fingerprint data,
(ii) with respect to a group of searched fingerprint feature points located around said coordinate reference point and a group of filed fingerprint feature points included in said filed fingerprint data,
(a) a check of the presence or absence of any singular point sprinkled in a vicinity coordinate range of said coordinate reference point which is specified in a fingerprint verification parameter,
(b) a zone check of a coordinate reference point vicinity coordinate range, and
(c) a quality check of a group of feature points located within a coordinate reference point vicinity coordinate range are carried out,
(iii) which of an axis verification scheme or an alignment verification scheme is to be used is determined.

* * * * *